United States Patent [19]
Yabuki et al.

[11] Patent Number: 5,633,322
[45] Date of Patent: May 27, 1997

[54] GOLF BALL

[75] Inventors: Yoshikazu Yabuki; Yoshinori Sano, both of Akashi, Japan

[73] Assignee: Sumitomo Rubber Industries, Ltd., Hyogo-ken, Japan

[21] Appl. No.: 395,887

[22] Filed: Feb. 28, 1995

[30] Foreign Application Priority Data

Feb. 28, 1994 [JP] Japan .................................. 6-055039

[51] Int. Cl.$^6$ ..................... C08L 33/02; A63B 37/06; A63B 37/12
[52] U.S. Cl. .................. 473/365; 260/998.14; 525/196; 525/221; 525/222; 525/227; 525/228; 473/377; 473/385
[58] Field of Search ................ 260/998.14; 273/235 R, 273/220; 525/221, 222, 227, 228, 196

[56] References Cited

U.S. PATENT DOCUMENTS

| | | | |
|---|---|---|---|
| 4,323,247 | 4/1982 | Keches et al. | 273/235 R |
| 4,650,193 | 3/1987 | Molitor | 273/228 |
| 4,884,814 | 12/1989 | Sullivan | 273/235 R |
| 4,946,898 | 8/1990 | Kasahara | 525/240 |
| 5,321,089 | 6/1994 | Cadorniga | 525/196 |
| 5,368,304 | 11/1994 | Sullivan | 273/220 |

FOREIGN PATENT DOCUMENTS

| | | |
|---|---|---|
| 0582487 | 2/1994 | European Pat. Off. . |
| 0622409 | 11/1994 | European Pat. Off. . |
| 0638337 | 2/1995 | European Pat. Off. . |

*Primary Examiner*—Fred Zitomer
*Attorney, Agent, or Firm*—Birch, Stewart, Kolasch & Birch, LLP

[57] ABSTRACT

Disclosed is a golf ball having excellent hit feeling, control properties and flying performances. The golf ball has a core and a cover for covering the core. The base resin of the cover comprises a mixture of three specific resins (A), (B), and (C), and the cover has a stiffness modulus of 130 to 300 MPa and a Shore D hardness of 43 to 58. Resin (A) is a high rigid ionomer resin or resin mixture, Resin (B) is a moderate rigid ionomer resin or resin mixture, and Resin (C) is a low rigid copolymer resin.

7 Claims, 1 Drawing Sheet

FIG.1

GOLF BALL

FIELD OF THE INVENTION

The present invention relates to a golf ball. More particularly, it relates to a golf ball having excellent hit feeling, control properties and flying performances.

BACKGROUND OF THE INVENTION

Recently, an ionomer resin has been used as a base resin for a cover of golf balls (e.g. Japanese Laid-Open Patent Publication No. 49(1974)-49727). Particularly, the ionomer resin is exclusively used in a two-piece golf ball containing a solid core therein.

This is because the ionomer resin is superior in durability, cut resistance and impact resilience and, further, it is easily processed.

However, the ionomer resin is inferior in hit feeling and control properties (ease of putting spin on the ball) in comparison with a balata used as the base resin for the cover of the thread wound golf ball, since the ionomer resin has high hardness and stiffness.

In order to improve hit feeling and control properties, Japanese Laid-Open Patent Publication No. 1(1989)-308577 suggests to soften a high-rigid ionomer resin by blending or mixing a soft ionomer resin comprising a sodium or zinc salt of a terpolymer of an olefin, an unsaturated monocarboxylic acid having 3 to 8 carbon atoms and an unsaturated acrylate having 2 to 22 carbon atoms therewith.

However, even if the soft ionomer resin as described above is blended, golf balls having hit feeling similar to that of the golf ball with the balata cover are not obtained.

The balata cover is characterized by the fact that stiffness modulus is comparatively high in spite of low hardness, which enables the balata-covered golf ball to have excellent control properties and hit feeling.

However, in the method of blending the soft ionomer resin described in Japanese Laid-Open Patent Publication No. 1(1989)-308577, when the trial of obtaining the hardness similar to that of the balata cover is made, the stiffness modulus becomes too small in comparison with the balata cover. On the other hand, when the trial of obtaining the stiffness modulus similar to that of the balata cover is made, the hardness becomes too large in comparison with the balata cover. In both cases, the hit feeling of the resulting golf ball is quite different from that of the balata-covered golf ball.

In addition to the above suggestion, various efforts of softening the ionomer resin to improve the hit feeling and the control properties have been made. However, satisfactory results have not been obtained.

As described above, the ionomer-covered golf ball is inferior in hit feeling and control properties in comparison with the balata-covered golf ball because the ionomer resin has high hardness and is rigid. And softening the ionomer resin to improve hit feeling and control properties has not been effective.

OBJECTS OF THE INVENTION

In order to solve the above problems, the present inventors have intensively studied the base resin used for the cover of a golf ball. As a result, it has been found that, by blending or mixing a high-rigid ionomer resin, a moderate-rigid terpolymer ionomer resin and a low-rigid copolymer resin having a specific structure, an ionomer based cover having a similar hardness and stiffness modulus to that of the balata cover can be obtained, and the golf ball produced therefrom has excellent hit feeling and control properties as well as flying performance and cut resistance.

Accordingly, main object of the present invention is to satisfy the excellent hit feeling and control properties which are similar to those of the balata cover as well as excellent flying performances and durability due to the ionomer resin, and simultaneously, to provide a golf ball having an excellent hit feeling, control properties and flying performances.

These objects as well as other objects and advantages of the present invention will become apparent to those skilled in the art from the following description with reference to the accompanying drawings.

The present invention will become more fully understood from the detailed description given hereinbelow and the accompanying drawings which are given by way of illustration only, and thus, are not limitative of the present invention, and wherein:

SUMMARY OF THE INVENTION

The present invention provides a golf ball having a core and a cover for covering the core, wherein a base resin of the cover comprises a mixture of the following three resins (A), (B) and (C), and the cover has a stiffness modulus of 130 to 300 MPa and a Shore D hardness of 43 to 58:

Resin (A): a high rigid ionomer resin or a resin mixture having a stiffness modulus of 300 to 500 MPa and a Shore D hardness of 60 to 70, obtained by neutralizing at least a part of carboxyl groups in a copolymer of an $\alpha$-olefin and an $\alpha,\beta$-unsaturated carboxylic acid having 3 to 8 carbon atoms with a metal ion or a mixture thereof;

Resin (B): a moderate rigid ionomer resin or a resin mixture having a stiffness modulus of 65 to 150 MPa and a Shore D hardness of 50 to 60, obtained by neutralizing at least a part of carboxyl groups in a terpolymer of an $\alpha$-olefin, an $\alpha,\beta$-unsaturated carboxylic acid having 3 to 8 carbon atoms and an $\alpha,\beta$-unsaturated carboxylic ester with a metal ion; and Resin (C): a low rigid copolymer resin having a stiffness modulus of 1 to 50 MPa and a Shore D hardness of 5 to 30, comprising an $\alpha$-olefin, an $\alpha,\beta$-unsaturated carboxylic ester having 3 to 8 carbon atoms and a polymerizable monomer containing a carboxyl group or an anhydrous carboxylic group other than the $\alpha,\beta$-unsaturated carboxylic ester as an essential monomer component.

DETAILED DESCRIPTION OF THE INVENTION

In the present invention, the resin (A) as the base resin of the cover is a high-rigid ionomer resin, obtained by neutralizing at least a portion of carboxyl groups in a copolymer of an $\alpha$-olefin and an $\alpha,\beta$-unsaturated carboxylic acid having 3 to 8 carbon atoms with a metal ion, which is one of the important factors for producing excellent resilient performances, flying performances and cut resistance.

The resin (C) is a softening component, which softens the high-rigid resin (A) to the desired state without deteriorating its resilient performances, while improving the hit feeling, control properties and the like.

The resin (B) is a terpolymer ionomer resin having a structure common to resins (A) and (C), which enhances compatibility with resins (A) and (C) and makes a uniform dispersion possible, and enhances durability and cut resistance without deteriorating the resilient performances and flying performances.

In the present invention, typical examples of the resin (A) include an ionomer resin obtained by neutralizing a portion of carboxyl groups in a copolymer of 80 to 90% by weight of an α-olefin and 10 to 20% by weight of a α,β-unsaturated carboxylic acid having 3 to 8 carbon atoms.

Examples of the α-olefin are ethylene, propylene, 1-butene, 1-pentene and the like. Among them, ethylene is particularly preferred. Examples of the α,β-unsaturatedcarboxylic acid having 3 to 8 carbon atoms are acrylic acid, methacrylic acid, fumaric acid, maleic acid, crotonic acid and the like. Among them, acrylic acid and methacrylic acid are particularly preferred. Further, examples of the metal ion for neutralizing at least a portion of carboxyl groups in the copolymer of a α-olefin and a α,β-unsaturated carboxylic acid having 3 to 8 carbon atoms include alkali ion, such as sodium ion and lithium ion; divalent metal ion, such as zinc ion, magnesium ion; and the like.

When the resin (A) is blended with the moderate-rigid resin (B) and low-rigid resin (C) as the softening component, it is necessary that the Shore D hardness and stiffness modulus of the resin (A) are within a range of 60 to 70 and 300 to 500 MPa, respectively, in order to accomplish low hardness (e.g. Shore D hardness of about 43 to 58, preferably about 45 to 56, similar to that of the balata cover), while maintaining the level of the balata cover having comparatively high rigidity (e.g. stiffness modulus of 130 to 300 MPa).

Examples of the resin (A) include high-rigid ionomer resins commercially available from Mitsui Du Pont Polychemical Co., Ltd. under the trade name of Hi-milan #1605, (Na), Hi-milan #1707 (Na), Hi-milan AM7318 (Na), Hi-milan AM7315 (Zn) and Hi-milan AM7317 (Zn); high-rigid ionomer resins commercially available from Du Pont U.S.A. Co. under the trade name of Surlyn #8940 (Na), Surlyn #8920 (Na) and Surlyn #7940 (Li); and high-rigid ionomer resins commercially available from Exxon chemical Co. under the trade name of Iotek 8000 (Na). Na, Li or Zn described in parentheses which are provided at the back of the trade name of the ionomer resin respectively indicates a kind of a metal ion for neutralizing the ionomer resin.

In the present invention, as to the resin (A), when a mixture of an ionomer resin neutralized with a monovalent metal ion and an ionomer resin neutralized with a divalent metal ion wherein both/either ionomer resins are the above high-rigid ionomer resins is particularly preferred in comparison with a mixture of the above high-rigid ionomer resin alone or ionomer resins neutralized with the same kinds of metal ions, because high rigidity and high impact resilience can be easily obtained.

Examples of the combination of the ionomer resin neutralized by the monovalent metal ion and ionomer resin neutralized with the divalent metal ion include Hi-milan #1605 (Na)/Hi-milan #1706 (Zn), Hi-milan #1605 (Na)/Hi-milan AM7317 (Zn), Hi-milan #7940 (Li)/Hi-milan #1706 (Zn), Hi-milan AM7317 (Zn)/Hi-milan AM7318 (Na), Hi-milan AM7318 (Na)/Hi-milan #1706 (Zn), Iotek 8000 (Na)/Iotek 7010 (Zn) and the like.

On the other hand, the resin (B) is a moderate-rigid terpolymer ionomer resin, which is obtained by neutralizing at least one part of carboxyl groups in a terpolymer of an α-olefin, an α,β-unsaturated carboxylic acid having 3 to 8 carbon atoms and an α,β-unsaturatedcarboxylic acid ester. It is necessary that the resin (B) has a stiffness modulus of 65 to 150 MPa and a Shore D hardness of 50 to 60.

Examples of the α-olefin for the resin (B) are ethylene, propylene, 1-butene, 1-pentene and the like. Among them, ethylene is particularly preferred. Examples of the α,β-unsaturatedcarboxylic acid having 3 to 8 carbon atoms for the resin (B) are acrylic acid, methacrylic acid, fumaric acid, maleic acid, crotonic acid and the like. Among them, acrylic acid and methacrylic acid are particularly preferred. Examples of the unsaturated carboxylic ester include acrylate, methacrylate, fumarate, maleate and crotonate of methyl, ethyl, propyl, n-butyl, isobutyl and the like. Among them, acrylate and methacrylate are particularly preferred.

The proportion of the α-olefin, α,β-unsaturated carboxylic acid having 3 to 8 carbon atoms and the β-unsaturated carboxylic acid ester is normally 70 to 90% by weight, 5 to 15% by weight and 5 to 15% by weight, respectively, the % by weight being based on a total amount of three monomers. Examples of the metal ion which neutralizes at least a portion of the carboxyl groups in the terpolymer thereof include an alkali ion, such as sodium ion, lithium ion; divalent metal ion, such as zinc ion, magnesium ion; and the like.

When the resin (B) is blended with the above resins (A) and (C), it is necessary that the resin (B) has a stiffness modulus of 65 to 150 MPa and a Shore D hardness of 50 to 60, so that the cover have the above characteristics.

Preferred examples of the resin (B) include Hi-milan #1855 (trade name, ethylene-butyl acrylate-methacrylic acid terpolymer ionomer resin neutralized with zinc ion), Hi-milan #1856 (trade name, ethylene-butyl acrylate-methacrylic acid terpolymer ionomer resin neutralized with sodium ion), etc., which are commercially available from Mitsui Du Pont Polychemical Co., Ltd.

The resin (C) is a copolymer resin comprising an α-olefin, an α,β-unsaturated carboxylic acid ester having 3 to 8 carbon atoms and a copolymerizable monomer containing a carboxyl group or an anhydrous carboxylic group other than the α,β-unsaturated carboxylic ester as essential monomer components. The resin (C) is a low-rigid resin having a stiffness modulus of 1 to 50 MPa and a Shore D hardness of 5 to 30.

Examples of the α-olefin for the resin (C) are ethylene, propylene, 1-butene, 1-pentene and the like. Among them, ethylene is particularly preferred. Examples of the α,β-unsaturated carboxylic ester having 3 to 8 carbon atoms as the monomer component for the resin (C) are acrylate, methacrylate, fumarate and maleate of methyl, ethyl, propyl, n-butyl, isobutyl and the like. Among them, acrylate and methacrylate are particularly preferred.

Examples of the polymerizable monomer containing a carboxyl group or a carboxylic anhydride group in the resin (C) include acrylic acid, methacrylic acid, maleic anhydride, fumaric acid, itaconic acid, etc., or a half ester of a dibasic acid such as maleic acid, fumaric acid or itaconic acid.

The composition ratio of the respective monomer components of this resin (C) can be varied as long as the resin (C) has a stiffness modulus of 1 to 50 MPa and a Shore D hardness of 5 to 30. Normally, it is preferred that the amount of the α-olefin, α,β-unsaturated carboxylic acid ester having 3 to 8 carbon atoms and polymerizable monomer containing the carboxyl group or anhydrous carboxylic group are 50 to 79% by weight, 20 to 40% by weight and 1 to 10% by weight, respectively, % by weight being based on a total amount of the monomers.

Preferred examples of the resin (C) include Nucrel AN4212C (trade name, ethylene-isobutyl acrylate-methacrylic acid terpolymer resin, composition ratio: 76/20/4 (weight ratio) which is commercially available from Mitsui Du Pont Polychemical Co., Ltd.), Bondine AX8390 (trade name, ethylene-ethyl acrylate-maleic anhydride terpolymer resin, ethyl acrylate+maleic anhydride=32% (among them, maleic anhydride=1 to 4%)) and Bondine AX8060 [trade name, ethylene-ethyl acrylate-maleic anhydride terpolymer resin, ethyl acrylate+maleic anhydride= 31% (among them, maleic anhydride=1 to 4%)) which are commercially available from Sumitomo Chemical Industries Co., Ltd. and the like.

The mixing ratio of the resin (A) to the resins (B) and (C) may be anyone which accomplish the hardness and stiffness modulus within the above range. Normally, it is preferred that the mixing ratio of the resin (A)/resin (B)/resin (C) is 20 to 60/10 to 60/5 to 50 (weight ratio).

In the present invention, the stiffness modulus and Shore D hardness of the cover are specified to 130 to 300 MPa and 43 to 58, respectively. The reason thereof is as follows.

That is, when the Shore D hardness is lower than 43, the cover is too soft and, on the other hand, when the Shore D hardness is higher than 58, the cover is too hard. In both cases, good hit feeling similar to the balata covered golf ball can not be obtained. Similar to the hardness, when the stiffness modulus deviates from the above specific range, good hit feeling similar to the balata-covered golf ball is not easily obtained and, at the same time, the following demerit is created. That is, when the stiffness modulus is lower than 130 MPa, the cover is too soft and the spin amount is too large, which results in a deterioration of the flying distance. On the other hand, when the stiffness modulus is higher than 300 MPa, a suitable amount of backspin is not obtained, which results in a deterioration in the control properties.

The reason why the stiffness modulus and Shore D hardness of the resin (A) are limited to 300 to 500 MPa and 60 to 70 and those of the resin (B) are limited to 65 to 150 MPa and 50 to 60, respectively, in the respective resin components, is as follows.

When the stiffness modulus of the resin (A) is lower than 300 MPa or when the stiffness modulus of the resin (B) is lower than 65 MPa, the stiffness modulus of the cover is smaller than 130 MPa after the resins (A) and (B) are blended into the resin (C). Accordingly, the cover is too soft and the spin amount is increased too much, which results in a decrease in the flying distance. On the other hand, when the stiffness modulus of the resin (A) is higher than 500 MPa or when that of the resin (B) is higher than 150 MPa, the stiffness modulus of the cover is higher than 300 MPa after the resins (A) and (B) are blended into the resin (C). Accordingly, it is impossible to obtain a suitable amount of backspin, as described above, which results in a deterioration in the of control properties.

Furthermore, when the Shore D hardness of the resin (A) is lower than 60 or when that of the resin (B) is lower than 50, the Shore D hardness of the cover is lower than 43 after the resins (A) and (B) is blended into the resin (C). Accordingly, the cover is too soft as described above, thereby affording no good hit feeling similar to the balata-covered golf ball. On the other hand, when the Shore D hardness of the resin (A) is higher than 70 or when that of the resin (B) is higher than 60, the Shore D hardness of the cover is higher than 58 after the resins (A) and (B) are blended into the resin (C). Accordingly, the cover is too hard, as described above, thereby affording no good hit feeling similar to that of the balata-covered golf ball.

The reason why the stiffness modulus of the resin (C) is limited to 1 to 50 MPa is as follows. That is, when the stiffness modulus of the resin (C) is higher than 50 MPa, it is impossible to adjust the stiffness modulus of the cover within a range of 300 MPa or less when the resin (C) is blended into the resins (A) and (B). it is also impossible to obtain a suitable backspin amount because of high stiffness modulus of the cover, which results in deterioration of control properties.

The reason why the Shore D hardness of the resin (C) is limited to 5 to 30 is as follows. That is, when the Shore D hardness of the resin (C) is lower than 5, the Shore D hardness of the cover is liable to be smaller than 43 when the resin (C) is blended into the resins (A) and (B). On the other hand, when the Shore D hardness of the resin (C) is higher than 30, the resin (A) can not be sufficiently softened while maintaining the constant stiffness modulus when the resin (C) is blended into the resins (A) and (B) so that the Shore D hardness of the cover is higher than 58 and it becomes difficult to maintain the Shore D hardness of the cover within a range of 43 to 58, thereby affording no good hit feeling similar to that of the golf ball with the balata cover.

If necessary, various additives such as pigments, dispersants, antioxidants, UV absorbers, photostabilizers, etc. can be formulated in the cover of the present invention, in addition to the base resin of the mixture of the resins (A), (B) and (C). Another resin can also be added to the base resin unless characteristics of the base resin are not deteriorated.

Further, a golf ball can be obtained by covering a core with the cover. As the core, any of a core for a solid golf ball (solid core) and a core for a thread wound golf ball (thread wound core) can be used.

The solid core may be a core for a multi-layer golf ball of two or more layers. For example, as the core for a two-piece golf ball, those obtained by subjecting a rubber composition to a press vulcanization to compress with heating (e.g. at a temperature of 140° to 170° C. for 10 to 40 minutes) into a spherical vulcanized article can be used. The rubber composition is prepared by formulating 10 to 60 parts by weight of at least one vulcanizing agent (crosslinking agent) of $\alpha,\beta$-ethylenically unsaturated carboxylic acids (e.g. acrylic acid, methacrylic acid, etc.) or metal salts thereof and functional monomers (e.g. trimethylolpropane trimethacrylate, etc.), 5 to 40 parts by weight of a filler (e.g. zinc oxide, barium sulfate, etc.), 0.5 to 5 parts by weight of a peroxide (e.g. dicumyl peroxide, etc.) and 0.1 to 1 part by weight of an antioxidant, based on 100 parts by weight of polybutadiene rubber.

The thread wound core is composed of a center and a thread rubber layer wound on the center. As the center, any of a liquid center and a rubber center can be used. As the rubber center, there can be used those obtained by vulcanizing a same rubber composition as that of the solid core.

The thread rubber may be those which have hitherto been used. For example, there can be used those obtained by vulcanizing a rubber composition wherein an antioxidant, a vulcanizing accelerator and sulfur are formulated in a natural rubber or a combination of natural rubber with synthetic polyisoprene. The core is not limited to the solid core and thread wound core.

A method of covering the cover on the core is not specifically limited, but may be a normal method. For example, there can be employed a method comprising molding a composition for the cover prepared by formulating a suitable amount of a requisite additive in the specific base material for the cover into a semi-spherical half-shell in advance, covering a core with two halfshells and then subjecting to a pressure molding at 130° to 170° C. for 1 to 15 minutes, or a method comprising subjecting the composition for the cover to an injection molding directly to cover the core. The thickness of the cover is normally about 1 to 3 mm. In case of cover molding, a dimple may be formed on the surface of the ball, if necessary. Further, if necessary, a paint or marking may be provided after cover molding.

Figure 1:
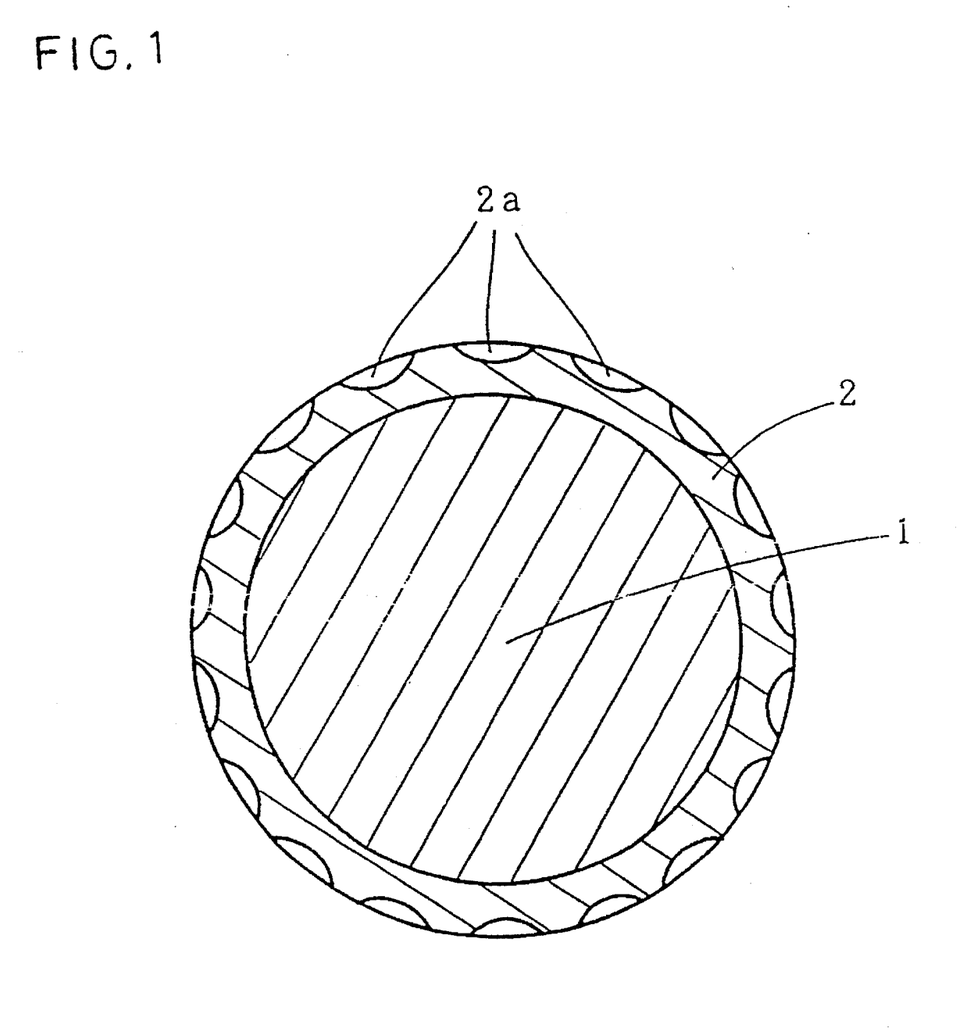
FIG. 1 is a schematic cross section illustrating one embodiment of the golf ball of the present invention.

The construction of the golf ball of the present invention will be explained with reference to the accompanying drawing. FIG. 1 is a schematic cross section illustrating one embodiment of the golf ball of the present invention. In FIG. 1, 1 is a core and 2 is a cover.

The core 1 may be a solid core or a thread wound core. The cover 2 is composed of a mixture of a resin (A), a resin (B) and a resin (C) as the base resin, as described above. The stiffness modulus and Shore D hardness of the cover 2 are 130 to 300 MPa and 43 to 58, respectively. Further, 2a is a dimple provided on the cover 2 and, if necessary, a suitable number of dimples 2a may be provided according to the desired characteristics.

As described above, according to the present invention, a golf ball having excellent hit feeling, control properties and flying performance can be obtained.

EXAMPLES

The following Examples and Comparative Examples further illustrate the present invention in detail but are not to be construed to limit the scope thereof.

Examples 1 to 7 and Comparative Examples 1 to 8 (thread wound golf ball)

① Preparation of core

A thread wound core having an outer diameter of 39.5 mm was prepared by winding a thread rubber comprising a natural rubber/low-cis IR [Shell IR-309 (trade name)](= 50:50) as the base rubber on a liquid center having an outer diameter of 28.1 mm, said liquid center comprising a paste obtained by dispersing barium sulfate in water and a center bag of a vulcanized natural rubber having a thickness of 1.7 mm, which covers the paste.

② Preparation of composition for cover

Regarding Preparation Examples 1 to 7 and Comparative Preparation Examples 1 to 7 used as the compositions for cover of Examples 1 to 7 and Comparative Examples 1 to 7, formulation components shown in Tables 1, 3, 5 and 7 were mixed by a kneading type twin-screw extruder to prepare a pelletized composition for the cover. Regarding Comparative Preparation Example 8 used as the composition for cover of Comparative Example 8, the formulation component is not shown in Table 7 and is shown at the back of Table 8 as *14 because of its balata cover.

The contents shown in the respective Tables are as follows. That is, the compositions of Preparation Examples 1 to 4 are shown in Table 1, and the stiffness modulus and Shore D hardness of the resins (A), (B) and (C) and composition for cover of Preparation Examples 1 to 4 are shown in Table 2. The compositions of Preparation Examples 5 to 7 are shown in Table 3, and the stiffness modulus and Shore D hardness of the resins (A), (B) and (C) and composition for cover of Preparation Examples 5 to 7 are shown in Table 4. The compositions of Comparative Preparation Examples 1 to 4 are shown in Table 5, and the stiffness modulus and Shore D hardness of the resins (A), (B) and (C) and composition for cover of Comparative Preparation Examples 1 to 4 are shown in Table 6. The compositions of Comparative Preparation Examples 5 to 7 are shown in Table 7, and the stiffness modulus and Shore D hardness of the resins (A), (B) and (C) and composition for cover of Comparative Preparation Examples 5 to 7 are shown in Table 8.

The formulation materials of which trade names were shown in Tables 1 to 8 will be explained at the back of Table 8. In the explanation about the formulation materials, "MI" is an abbreviation for "Melt Index". The amount of each component in Tables 1 to 8 is "parts by weight".

The extrusion conditions are as follows: a screw diameter: 45 mm; a screw revolution per minute: 200 rpm; a screw L/D: 35. The formulation components were heated at 200° to 250° C. at the die position of the extruder. The measuring methods of the stiffness modulus and Shore D hardness are as follows.

Stiffness modulus:

It is measured according to ASTM D-747 after a sheet having a thickness of about 2 mm obtained by heat-press molding was preserved at 23° C. for two weeks.

Shore D hardness:

It is measured according to ASTM D-2240 after a sheet having a thickness of about 2 mm obtained by heat-press molding was preserved at 23° C. for two weeks.

TABLE 1

|  |  | Preparation Example No. | | | |
| --- | --- | --- | --- | --- | --- |
|  |  | 1 | 2 | 3 | 4 |
| Resin (A) (High-rigid resin) | | | | | |
| Hi-milan#1605 | *1 | 20 | 20 | — | — |
| Hi-milan#1706 | *2 | 20 | 20 | — | — |
| Hi-milanAM7318 | *3 | — | — | 15 | — |
| Hi-milanAM7317 | *4 | — | — | 15 | 20 |
| SurlynAD7940 | *5 | — | — | — | 20 |
| Iotek#8000 | *6 | — | — | — | — |
| Iotek#7010 | *7 | — | — | — | — |
| Resin (B) (Moderate-rigid resin) | | | | | |
| Hi-milan#1855 | *8 | 30 | — | 35 | 30 |
| Hi-milan#1856 | *9 | — | 30 | — | - |
| Resin (C) (Low-rigid resin) | | | | | |
| NucrelAN4212C | *10 | 30 | 30 | 35 | 30 |
| BondineAX8390 | *11 | — | — | — | - |
| SurlynAD8269 | *12 | — | — | — | — |
| SurlynAD8265 | *13 | — | — | — | - |
| Other formulation components (fillers) | | | | | |
| Titanium dioxide | | 2.0 | 2.0 | 2.0 | 2.0 |
| Barium sulfate | | 2.0 | 2.0 | 2.0 | 2.0 |

TABLE 2

|  | Preparation Example No. | | | |
| --- | --- | --- | --- | --- |
|  | 1 | 2 | 3 | 4 |
| Resin (A) | | | | |
| Stiffness modulus (MPa) | 340 | 340 | 410 | 420 |
| Shore D hardness | 63 | 63 | 65 | 65 |
| Resin (B) | | | | |
| Stiffness modulus (MPa) | 90 | 85 | 90 | 90 |

TABLE 2-continued

|  | Preparation Example No. | | | |
|---|---|---|---|---|
|  | 1 | 2 | 3 | 4 |
| Shore D hardness | 55 | 53 | 55 | 55 |
| Resin (C) | | | | |
| Stiffness modulus (MPa) | 24 | 24 | 24 | 24 |
| Shore D hardness | 30 | 30 | 30 | 30 |
| Composition for cover | | | | |
| Stiffness modulus (MPa) | 150 | 150 | 160 | 200 |
| Shore D hardness | 49 | 49 | 50 | 52 |

TABLE 3

|  |  | Preparation Example No. | | |
|---|---|---|---|---|
|  |  | 5 | 6 | 7 |
| Resin (A) (High-rigid resin) | | | | |
| Hi-milan #1605 | *1 | — | 20 | — |
| Hi-milan #1706 | *2 | — | 20 | — |
| Hi-milan AM7318 | *3 | — | — | — |
| Hi-milan 7317 | *4 | — | — | 20 |
| Surlyn AD7940 | *5 | — | — | 20 |
| lotek #8000 | *6 | 25 | — | — |
| lotek #7010 | *7 | 25 | — | — |
| Resin (B) (Moderate-rigid resin) | | | | |
| Hi-milan #1855 | *8 | 25 | 40 | 30 |
| Hi-milan #1856 | *9 | — | — | — |
| Resin (C) (Low-rigid resin) | | | | |
| Nucrel AN4212C | *10 | 25 | — | — |
| Bondine AX8390 | *11 | — | 20 | 30 |
| Surlyn AD8269 | *12 | — | — | — |
| Surlyn AD8265 | *13 | — | — | — |
| Other formulation components (fillers) | | | | |
| Titanium dioxide | | 2.0 | 2.0 | 2.0 |
| Barium sulfate | | 2.0 | 2.0 | 2.0 |

TABLE 4

|  | Preparation Example No. | | |
|---|---|---|---|
|  | 5 | 6 | 7 |
| Resin (A) | | | |
| Stiffness modulus (MPa) | 380 | 340 | 420 |
| Shore D hardness | 63 | 63 | 65 |
| Resin (B) | | | |
| Stiffness modulus (MPa) | 90 | 90 | 90 |
| Shore D hardness | 55 | 55 | 55 |
| Resin (C) | | | |
| Stiffness modulus (MPa) | 24 | <10 | <10 |
| Shore D hardness | 30 | 14 | 14 |
| Composition for cover | | | |
| Stiffness modulus (MPa) | 270 | 140 | 170 |
| Shore D hardness | 54 | 50 | 48 |

TABLE 5

|  |  | Comparative Preparation Example No. | | | |
|---|---|---|---|---|---|
|  |  | 1 | 2 | 3 | 4 |
| Resin (A) (High-rigid resin) | | | | | |
| Hi-milan #1605 | *1 | 30 | 20 | — | — |
| Hi-milan #1706 | *2 | 30 | 20 | — | 60 |
| Hi-milan AM7318 | *3 | — | — | 25 | — |
| Hi-milan AM7317 | *4 | — | — | 25 | — |
| Surlyn AD7940 | *5 | — | — | — | — |
| lotek #8000 | *6 | — | — | — | — |
| lotek #7010 | *7 | — | — | — | — |
| Resin (B) (Moderate-rigid resin) | | | | | |
| Hi-milan #1855 | *8 | — | — | — | 40 |
| Hi-milan #1856 | *9 | — | — | — | — |
| Resin (C) (Moderate-rigid resin) | | | | | |
| Nucrel AN4212C | *10 | — | — | — | — |
| Bondine AX8390 | *11 | — | — | — | — |
| Surlyn AD8269 | *12 | 40 | — | 50 | — |
| Surlyn AD8265 | *13 | — | 60 | — | — |
| Other formulation components (fillers) | | | | | |
| Titanium dioxide | | 2.0 | 2.0 | 2.0 | 2.0 |
| Barium sulfate | | 2.0 | 2.0 | 2.0 | 2.0 |

TABLE 6

|  | Comparative Preparation Example No. | | | |
|---|---|---|---|---|
|  | 1 | 2 | 3 | 4 |
| Resin (A) | | | | |
| Stiffness modulus (MPa) | 340 | 340 | 410 | 260 |
| Shore D hardness | 63 | 63 | 65 | 61 |
| Resin (B) | | | | |
| Stiffness modulus (MPa) | — | — | — | 90 |
| Shore D hardness | — | — | — | 55 |
| Resin (C) | | | | |
| Stiffness modulus (MPa) | 26 | 55 | 26 | — |
| Shore D hardness | 36 | 47 | 36 | — |
| Composition for cover | | | | |
| Stiffness modulus (MPa) | 160 | 120 | 200 | 180 |
| Shore D hardness | 57 | 57 | 59 | 60 |

TABLE 7

|  |  | Comparative Preparation Example No. | | | |
|---|---|---|---|---|---|
|  |  | 5 | 6 | 7 | 8 |
| Resin (A) (High-rigid resin) | | | | | *14 |
| Hi-milan #1605 | *1 | 15 | 15 | 50 | Balata |
| Hi-milan #1706 | *2 | 15 | 15 | 50 | cover |
| Hi-milan AM7318 | *3 | — | — | — | |
| Hi-milan AM7317 | *4 | — | — | — | |
| Surlyn AD7940 | *5 | — | — | — | |
| lotek #8000 | *6 | — | — | — | |
| lotek #7010 | *7 | — | — | — | |
| Resin (B) (Moderate-rigid resin) | | | | | |
| Hi-milan #1855 | *8 | 70 | 25 | — | |

TABLE 7-continued

|  | | Comparative Preparation Example No. | | | |
|---|---|---|---|---|---|
|  | | 5 | 6 | 7 | 8 |
| Hi-milan #1856 | *9 | — | — | — | |
| Resin (C) (Moderate-rigid resin) | | | | | |
| Nucrel AN4212C | *10 | — | 45 | — | |
| Bondine AX8390 | *11 | — | — | — | |
| Surlyn AD8269 | *12 | — | — | — | |
| Surlyn AD8265 | *13 | — | — | — | |
| Other formulation components (fillers) | | | | | |
| Titanium dioxide | | 2.0 | 2.0 | 2.0 | |
| Barium sulfate | | 2.0 | 2.0 | 2.0 | |

TABLE 8

|  | Comparative Preparation Example No. | | | |
|---|---|---|---|---|
|  | 5 | 6 | 7 | 8 |
| Resin (A) | | | | |
| Stiffness modulus (MPa) | 340 | 340 | 340 | — |
| Shore D hardness | 63 | 63 | 63 | — |
| Resin (B) | | | | |
| Stiffness modulus (MPa) | 90 | 90 | — | — |
| Shore D hardness | 55 | 55 | — | — |
| Resin (C) | | | | |
| Stiffness modulus (MPa) | — | 24 | — | — |
| Shore D hardness | — | 30 | — | — |
| Composition for cover | | | | |
| Stiffness modulus (MPa) | 150 | 115 | 340 | 250 |
| Shore D hardness | 59 | 40 | 63 | 47 |

③ Production of golf ball

A thread wound golf ball was obtained by molding a semi-spherical half-shell from the cover composition of the above item (2), covering the core of the item (1) with two half-shells and then subjecting to a press molding in a die for the golf ball. The thread wound golf ball was coated with a paint to give a coated golf ball of 42.7 mm in diameter.

The ball weight, the ball compression, the ball initial velocity and the flying distance carry of the golf ball thus obtained were measured. The ball compression was measured by PGA method, and the ball initial velocity was measured by R & A initial velocity measuring method. The flying distance was measured by hitting with a No.1 wood club at a head speed of 45 m/second, using a swing robot manufactured by True Temper Co.

Furthermore, in order to examine the cut resistance of the golf balls of the Examples 1 to 7 and Comparative Examples 1 to 8, the top part of the golf ball was hit at a head speed of 30 m/second using a swing robot mounted with a pitching wedge manufactured by True Temper Co. to examine whether a cut mark is arisen or not. The evaluation criteria are as follows.

Evaluation criteria

○: No cut mark is formed.

Δ: Slight cut mark is formed.

X: Large cut mark is formed.

XX: Large cut mark which can not stand use is formed.

Further, in order to examine the durability of the above golf ball, a golf ball was hit with a No. 1 wood club at a head speed of 45 m/second using a swing robot manufactured by True Temper Co., and the number of times until breakage was arisen was measured. The resulting value was indicated as a durability index in case of the number of Example 1 being 100.

Further, the hit feeling and the control properties of the resulting golf ball were evaluated by 10 top professional golfers according to a practical hitting test. The evaluation criteria are as follows. The results shown in the Tables below are based on the fact that not less than 8 out of 10 professional golfers evaluated with the same criterion about each test item.

Evaluation criteria

○: Good, hit feeling and control properties are similar to those of the golf ball with the balata cover.

Δ: Control properties are similar to those of the golf ball with the balata cover, but hit feeling is quite different from that of the golf ball with the balata cover, that is, it is too heavy, which results in too strong impact, or it is too soft, which results in heavy feeling.

X: Both hit feeling and control properties are inferior.

In Table 9, the ball weight, the ball compression, the ball initial velocity, the flying distance (carry), the cut resistance, the durability, the hit feeling and the control properties of the golf balls of Examples 1 to 4, and the kind of the composition for the cover used in the production of the golf ball are shown. Those of the gold balls of Examples 5 to 7, those of the golf balls of Comparative Examples 1 to 4 and those of the golf balls of Comparative Examples 1 to 8 are shown in Tables 10, 11 and 12, respectively. The kind of the composition for the cover is shown by Preparation Example No. or Comparative Preparation Example No.

TABLE 9

|  | Example No. | | | |
|---|---|---|---|---|
|  | 1 | 2 | 3 | 4 |
| Composition for cover (Preparation Example No.) | No. 1 | No. 2 | No. 3 | No. 4 |
| Ball weight (g) | 45.4 | 45.4 | 45.3 | 45.3 |
| Ball compression | 86 | 86 | 87 | 88 |
| Ball initial velocity (feet/second) | 252.7 | 252.6 | 252.8 | 253.0 |
| Flying distance (yard) | 228 | 227 | 228 | 229 |
| Cut resistance | ○ | ○ | ○ | ○ |
| Durability | 100 | 100 | 98 | 97 |
| Hit feeling and control properties | ○ | ○ | ○ | ○ |

TABLE 10

|  | Example No. | | |
| --- | --- | --- | --- |
|  | 5 | 6 | 7 |
| Composition for cover (Preparation Example No.) | No. 5 | No. 6 | No. 7 |
| Ball weight (g) | 45.4 | 45.3 | 45.3 |
| Ball compression | 90 | 86 | 87 |
| Ball initial velocity (feet/second) | 253.1 | 252.6 | 252.7 |
| Flying distance (yard) | 230 | 227 | 228 |
| Cut resistance | ○ | ○ | ○ |
| Durability | 95 | 110 | 98 |
| Hit feeling and control properties | ○ | ○ | ○ |

TABLE 11

|  | Comparative Example No. | | | |
| --- | --- | --- | --- | --- |
|  | 1 | 2 | 3 | 4 |
| Composition for cover (Comparative Preparation Example No.) | No. 1 | No. 2 | No. 3 | No. 4 |
| Ball weight (g) | 45.4 | 45.4 | 45.4 | 45.3 |
| Ball compression | 88 | 88 | 89 | 89 |
| Ball initial velocity (feet/second) | 251.0 | 251.0 | 251.2 | 251.2 |
| Flying distance (yard) | 223 | 223 | 224 | 224 |
| Cut resistance | ○ | X | Δ | ○ |
| Durability | 97 | 98 | 90 | 85 |
| Hit feeling and control properties | Δ | Δ | Δ | Δ |

TABLE 12

|  | Comparative Example No. | | | |
| --- | --- | --- | --- | --- |
|  | 5 | 6 | 7 | 8 |
| Composition for cover (Comparative Preparation Example No.) | No. 5 | No. 6 | No. 7 | No. 8 |
| Ball weight (g) | 45.3 | 45.3 | 45.4 | 45.4 |
| Ball compression | 88 | 86 | 92 | 88 |
| Ball initial velocity (feet/second) | 251.0 | 250.6 | 253.0 | 251.0 |
| Flying distance (yard) | 223 | 222 | 230 | 223 |
| Cut resistance | ○ | Δ | ○ | XX |
| Durability | 88 | 120 | 60 | 40 |
| Hit feeling and control properties | Δ | Δ | X | ○ |

Among the above golf balls, the golf ball of Comparative Example 7 is a standard thread wound golf ball with the ionomer cover wherein only a high-rigid ionomer resin is used as the base resin of the cover, and the golf ball of Comparative Example 8 is a standard thread wound golf ball with the balata cover wherein only a balata (transpolyisoprene) cover is used, which are golf balls for a criterion of comparison.

As is apparent from the results shown in Tables 9 to 12, all of the golf balls of Examples 1 to 7 had excellent hit feeling and control properties similar to those of the golf ball with the balata cover of Comparative Example 8, and the flying distance, cut resistance and durability attained to a satisfactory level.

That is, the golf balls of Examples 1 to 7 of the present invention are those in which the mixture of the resin (A) as the high-rigid ionomer resin, the resin (B) as the moderate-rigid terpolymer ionomer resin and the resin (C) as the low-rigid copolymer resin having a specific structure is used as the base resin for the cover. All of the golf balls of Examples 1 to 7 had excellent hit feeling and control properties similar to those of the golf ball of Comparative Example 8 as the normal balata cover thread wound golf ball. Further, the golf balls of Examples 1 to 7 attained the flying distance of 228 to 230 yards, which is almost the same as that of the golf ball of Comparative Example 7 as the normal thread wound golf ball with the ionomer cover, and the cut resistance is almost the same as that of the golf ball of Comparative Example 7 and attained to a satisfactory level. Further, the durability of the golf balls of Examples 1 to 7 was considerably excellent in comparison with that of Comparative Example 7.

On the other hand, the golf balls of Comparative Examples 1 to 3 wherein a combination of the high-rigid ionomer resin and soft ionomer resin [ e.g. Surlyn AD8269 and Surlyn AD8265 (both are trade name)] was used as the base resin for the cover according to a prior art showed control properties similar to those of the golf ball with the balata cover, but the hit feeling was inferior. Also, the flying distance was 223 to 224 yards, which was considerably inferior in comparison with the golf balls of Examples 1 to 7. The cut resistance was also inferior.

Further, the golf balls of Comparative Examples 4 and 5 wherein a combination of the high-rigid ionomer resin and moderate-rigid three-dimensional ionomer resin [e.g. Surlyn #1855 and Surlyn #1856 (both are trade name)] was used as the base resin for the cover showed good cut resistance and control properties similar to those of the golf ball with the balata cover, but the hit feeling was inferior. Also, the flying distance was 223 to 224 yards, which was considerably inferior in comparison with the golf balls of Examples 1 to 7.

The golf ball of Comparative Example 6 is that wherein a mixture of the high-rigid ionomer resin, moderate-rigid three-dimensional ionomer resin and low-rigid copolymer resin having a specific structure was used as the base resin for the cover. However, since the stiffness modulus and Shore D hardness of the cover are 115 MPa and 40, respectively and are lower than the range (stiffness modulus: 130 to 300 MPa, Shore D hardness: 43 to 58) defined in the present invention, the cover became too soft. Therefore, the flying distance of the golf ball was inferior (i.e. 222 yard) and the cut resistance was also inferior. The control properties were similar to those of the golf ball with the balata cover but the hit feeling was inferior.

Further, the golf ball of Comparative Example 7 as the normal thread wound golf ball with the ionomer cover showed hard hit feeling and was inferior control properties. Further, the golf ball of Comparative Example 8 as the normal thread wound golf ball with the balata cover was superior in hit feeling and control properties. However, the flying distance was 223 yards, which was considerably inferior in comparison with the golf balls of Examples 1 to 7. Particularly, the cut resistance and durability were considerably inferior. Examples 8 to 14 and Comparative Examples 9 to 15 (two-piece solid golf ball)

① Preparation of core

A rubber composition prepared by formulating 36 parts by weight of zinc acrylate, 20 parts by weight of zinc oxide, 1.2 parts by weight of dicumyl peroxide and 0.5 part by weight of an antioxidant [Yoshinox 425 (trade name), manufactured by Yoshitomi Seiyaku Co., Ltd.] in 100 parts by weight of a butadiene rubber [BR-11 (trade name), manufactured by Nihon Gosei Gomu Co., Ltd] was subjected to a vulcanization molding at 160° C. for 25 minutes to give a solid core. The average diameter of the solid core thus obtained was 38.2 mm.

② Preparation of composition for cover

The pelletized compositions for the cover prepared in Preparation Examples 1 to 7 and Comparative Preparation Examples 1 to 7 were used.

③ Production of golf ball

The composition for the cover obtained in the above item ② was coated on the solid core obtained in the above item ① by an injection molding to give a coated golf ball of 42.7 mm in diameter.

The ball weight, the ball compression, the ball initial velocity, the flying distance, the cut resistance and the durability of the golf ball thus obtained were measured and, further, the hit feeling and the control properties were examined.

In Table 13, the ball weight, the ball compression, the ball initial velocity, the flying distance, the cut resistance, the durability, the hit feeling and the control properties of the golf balls of Examples 8 to 12, and the kind of the composition for the cover used in the production of the golf ball are shown. Those of the golf balls of Examples 13 and 14 and Comparative Examples 9 to 11 are shown in Table 14, and those of the golf balls of Comparative Examples 12 to 15 are shown in Table 15.

The golf ball of Comparative Example 15 is a standard two-piece solid golf ball wherein only the high-rigid ionomer resin was used as the base resin of the cover, and is a golf ball for a criterion of comparison. Further, the measuring methods of various physical properties and the evaluation methods of the hit feeling and the control properties are the same as those used in the Examples 1 to 7.

TABLE 13

|  | Example No. | | | | |
| --- | --- | --- | --- | --- | --- |
| Composition for cover | 8 Preparation Example 1 | 9 Preparation Example 2 | 10 Preparation Example 3 | 11 Preparation Example 4 | 12 Preparation Example 5 |
| Ball weight (g) | 43.4 | 45.4 | 45.3 | 45.3 | 45.4 |
| Ball compression | 90 | 90 | 91 | 92 | 94 |
| Ball initial velocity (feet/second) | 253.0 | 252.9 | 253.1 | 253.3 | 253.4 |
| Flying distance (yard) | 231 | 230 | 231 | 232 | 233 |
| Cut resistance | o | o | o | o | o |
| Durability | 100 | 100 | 98 | 97 | 95 |
| Hit feeling and control properties | o | o | o | o | o |

TABLE 14

|  | Example No. | | Comparative Example No. | | |
| --- | --- | --- | --- | --- | --- |
|  | 13 | 14 | 9 | 10 | 11 |
| Composition for cover | Preparation Example 6 | Preparation Example 7 | Comparative Preparation Example 1 | Comparative Preparation Example 2 | Comparative Preparation Example 3 |
| Ball weight (g) | 45.3 | 45.3 | 45.4 | 45.4 | 45.4 |
| Ball compression | 90 | 91 | 92 | 92 | 93 |

TABLE 14-continued

|  | Example No. | | Comparative Example No. | | |
| --- | --- | --- | --- | --- | --- |
|  |  |  | 9 | 10 | 11 |
| Composition for cover | 13 Preparation Example 6 | 14 Preparation Example 7 | Comparative Preparation Example 1 | Comparative Preparation Example 2 | Comparative Preparation Example 3 |
| Ball initial velocity (feet/second) | 252.9 | 253.0 | 251.3 | 251.3 | 251.5 |
| Flying distance (yard) | 230 | 231 | 226 | 226 | 227 |
| Cut resistance | ○ | ○ | Δ | X | Δ |
| Durability | 110 | 98 | 97 | 98 | 90 |
| Hit feeling and control properties | ○ | ○ | Δ | Δ | Δ |

TABLE 15

|  | Comparative Example No. | | | |
| --- | --- | --- | --- | --- |
|  | 12 | 13 | 14 | 15 |
| Composition for cover | Comparative Preparation Example 4 | Comparative Preparation Example 5 | Comparative Preparation Example 6 | Comparative Preparation Example 7 |
| Ball weight (g) | 45.3 | 45.3 | 46.3 | 45.4 |
| Ball compression | 93 | 92 | 90 | 96 |
| Ball initial velocity (feet/second) | 251.5 | 251.3 | 250.9 | 253.3 |
| Flying distance (yard) | 227 | 226 | 225 | 233 |
| Cut resistance | ○ | ○ | Δ | ○ |
| Durability | 85 | 88 | 120 | 60 |
| Hit feeling and control properties | Δ | Δ | Δ | X |

As is apparent from the results shown in Tables 13 and 14, the two-piece solid golf balls of the Examples 8 to 14 of the present invention were superior in hit feeling, control properties and flying performance, similar to the thread wound golf balls of the Examples 1 to 7.

That is, the golf balls of Examples 8 to 14 attained the flying distance of 230 to 233 yards, which is almost the same as that of the golf ball of Comparative Example 15 wherein only the high-rigid ionomer resin was used as the base resin for the cover, and were superior in flying performance. Further, the golf balls of Examples 8 to 14 were superior in hit feeling and control properties.

The golf balls of the Examples of 8 to 14 were superior in cut resistance and durability. Particularly, they were considerably superior in durability in comparison with the golf ball of Comparative Example 15 as a standard for comparison.

On the other hand, the golf ball of Comparative Example 15 was superior in flying performance and cut resistance, but the hit feeling and the control properties were inferior. The golf balls of the Comparative Examples 8 to 13 were not inferior in hit feeling and control properties, but the flying distance was considerably inferior in comparison with the golf balls of the Examples 8 to 14.

What is claimed is:

1. A golf ball having a core and a cover for covering the core, wherein the base resin of said cover comprises a mixture of the following three resins (A), (B) and (C) in a mixing weight ratio of 20 to 60, 10, to 60, and 5 to 50, respectively, and said cover having a stiffness modulus of 130 to 300 MPa and a Shore D hardness of 43 to 58, wherein Resin (A) is a high rigid ionomer resin or a resin mixture having a stiffness modulus of 300 to 500 MPa and a Shore D hardness of 60 to 70, obtained by neutralizing at least a part of carboxyl groups in a copolymer of an α-olefin and an α,β-unsaturated carboxylic acid having 3 to 8 carbon atoms with a metal ion or a mixture thereof;

Resin (B) is a moderate rigid ionomer resin or a resin mixture having a stiffness modulus of 65 to 150 MPa and a Shore D hardness of 50 to 60, obtained by neutralizing at least a part of carboxyl groups in a terpolymer of an α-olefin, an α,β-unsaturated carboxylic acid having 3 to 8 carbon atoms and an α,β-unsaturated carboxylic ester with a metal ion; and Resin (C) is a low rigid copolymer resin having a stiffness modulus of 1 to 50 MPa and a Shore D hardness of 5 to 30, comprising an α-olefin, an α,β-unsaturated carboxylic ester having 3 to 8 carbon atoms and a polymerizable monomer containing a carboxyl group or a carboxylic anhydride group.

2. The golf ball according to claim 1, wherein the resin (A) is a mixture of an ionomer resin neutralized with a monovalent metal ion and an ionomer resin neutralized with a divalent metal ion.

3. The golf ball according to claim 1, wherein the α-olefin, α,β-unsaturated carboxylic acid and α,β-unsaturated carboxylic acid ester of the resin (B) are ethylene, acrylic acid or methacrylic acid and acrylate or methacrylate, respectively.

4. The golf ball according to claim 1, wherein the resin (C) is a terpolymer resin of ethylene, an acrylate or methacrylate of methyl, ethyl, propyl, or n-butyl, and acrylic acid or methacrylic acid.

5. The golf ball according to claim 1, wherein the resin (C) is a terpolymer resin of ethylene, an acrylate or methacrylate of methyl, ethyl, propyl, or n-butyl, and maleic anhydride.

6. The golf ball according to claim 1, wherein the resin (C) is a terpolymer resin of ethylene, an acrylate or methacrylate of methyl, ethyl, propyl, or n-butyl, and a half ester of a dibasic acid.

7. The golf ball of claim 1, wherein the Shore D hardness of the cover is 45 to 56.

* * * * *